United States Patent
Carnegie et al.

(10) Patent No.: US 7,016,791 B2
(45) Date of Patent: Mar. 21, 2006

(54) PARTICLE SIZING REFINEMENT SYSTEM

(75) Inventors: Steven J. Carnegie, Portland, OR (US); Meindert J. Kleefstra, Vancouver, WA (US); Isaac S. Simpson, Portland, OR (US); John N. Skardon, Vancouver, WA (US)

(73) Assignee: AirAdvice, Inc., Portland, OR (US)

( * ) Notice: Subject to any disclaimer, the term of this patent is extended or adjusted under 35 U.S.C. 154(b) by 0 days.

(21) Appl. No.: 10/678,589

(22) Filed: Oct. 2, 2003

(65) Prior Publication Data

US 2004/0138828 A1    Jul. 15, 2004

Related U.S. Application Data

(60) Provisional application No. 60/415,910, filed on Oct. 2, 2002.

(51) Int. Cl.
  *G01N 31/00* (2006.01)
  *G06F 19/00* (2006.01)

(52) U.S. Cl. ..................................................... 702/29

(58) Field of Classification Search ................ 702/21, 702/29; 356/336, 338; 327/26; 436/517
See application file for complete search history.

(56) References Cited

U.S. PATENT DOCUMENTS

| | | | | |
|---|---|---|---|---|
| 4,009,443 A | * | 2/1977 | Coulter et al. | 327/26 |
| 4,205,384 A | * | 5/1980 | Merz et al. | 702/29 |
| 4,375,334 A | * | 3/1983 | Gerber | 356/336 |
| 4,488,248 A | * | 12/1984 | Okada et al. | 702/21 |
| 4,736,311 A | * | 4/1988 | Takeuchi et al. | 702/29 |
| 4,889,815 A | * | 12/1989 | Bradwell et al. | 436/517 |
| 5,085,500 A | * | 2/1992 | Blesener | 356/338 |
| 5,379,113 A | * | 1/1995 | Niwa | 356/336 |
| 5,870,190 A | * | 2/1999 | Unger | 356/336 |
| 5,999,250 A | * | 12/1999 | Hairston et al. | 356/73 |
| 6,683,975 B1 | * | 1/2004 | Wang et al. | 382/141 |
| 6,936,835 B1 | * | 8/2005 | Nishiyama et al. | 250/559.41 |

* cited by examiner

*Primary Examiner*—John Barlow
*Assistant Examiner*—Aditya S. Bhat
(74) *Attorney, Agent, or Firm*—Schwabe, Williamson & Wyatt, P.C.

(57) ABSTRACT

A plurality of particle size reference values are specified. Particle size data is obtained based at least in part on the specified plurality of particle size reference values.

7 Claims, 3 Drawing Sheets

Fig 5.

```
                    ┌─────────────────────┐
                    │  Obtain current     │ ─14
                    │  particle count per │          ┌─────────────┐
                    │  channel from Particle│◄──────│ Recheck in 10│
                    │  Sizing Appliance   │          │   minutes   │
                    └──────────┬──────────┘          └─────────────┘
                               │                            ▲
                               ▼    15                      │
                         ╱─────────────╲                    │
                        ╱ Does a sufficient╲                │
              Yes──────╱ number of particles ╲──── No ──────┤
                       ╲ exist in the "pollen"╱              │
                        ╲  size range?       ╱               │
                         ╲─────────────────╱                 │
                               │                             │
                               ▼                             │
                    ┌─────────────────────┐                  │
                    │ Change reference    │                  │
                    │ values to "focus" on│                  │
                    │ particle sizes within│─16              │
                    │ "pollen" size range │                  │
                    └──────────┬──────────┘                  │
                               ▼                             │
                    ┌─────────────────────┐                  │
                    │ Transmit changed    │                  │
                    │ reference values to │─17               │
                    │ Particle Sizing     │                  │
                    │ Appliance           │                  │
                    └──────────┬──────────┘                  │
                               ▼                             │
                    ┌─────────────────────┐                  │
                    │ Obtain new          │                  │
                    │ particle count per  │─18               │
                    │ channel from Particle│                 │
                    │ Sizing Appliance    │                  │
                    └──────────┬──────────┘                  │
                               ▼                             │
                         ╱─────────────╲                     │
                        ╱ Do sufficient  ╲                   │
                       ╱ number of particles╲── No ──────────┤
                       ╲ exist in the "ragweed╱              │
                        ╲ pollen" size range?╱               │
                         ╲─────────────────╱                 │
                           Yes │                             │
                               ▼                             │
                    ┌─────────────────────┐  ┌─────────────────────┐
                    │ Issue alert for     │  │ Reset reference values│
                    │ ragweed pollen      │─19│ to original value and │─20
                    │ presence in the air │  │ transmit to Particle  │
                    └─────────────────────┘  │ Sizing Appliance      │
                                             └─────────────────────┘
```

PARTICLE SIZING REFINEMENT SYSTEM

RELATED APPLICATION

This application claims priority to U.S. Provisional Application Ser. No. 60/415,910, titled "Remote Particle Detection Apparatus", filed on Oct. 2, 2002, which is hereby fully incorporated by reference.

FIELD OF THE INVENTION

The present invention relates to the field of measuring systems and specifically to systems for measuring particles in the air.

BACKGROUND INFORMATION

Indoor air quality is a term that describes the cleanliness or livability of air inside a structure where people live, work, or play. Particulates are a major component of indoor air quality, and the size and quantity of airborne particulates are key indicators of indoor air quality. The mixture of particles inside a building can include many sizes of particles from many origins such as: plant and animal allergens, mold/mildew allergens, insect allergens, outdoor air contaminants, tobacco smoke and a wide variety of other materials. Sufficiently small particles, those less than 10 microns in diameter, can stay airborne for extended periods. Larger particles are only airborne when disturbed by airflow or human activity such as cleaning. It is a primary objective in particulate measurement investigations to identify the distribution of the particle count by size, and then use the size information to further define the possible origin of particles.

Size distribution can be as simple as large and smaller particles. Existing EPA regulations have explicit limits on particulate matter at 10 micron and 2.5 micron size ranges. Particles with a diameter of 2.5 microns are called fine particulates. For example, a basic separation of particulates around the regulatory-based 2.5 micron cut point allows for the identification of larger "dust" and smaller "fine" particles. The time varying relationship between these two measurements can provide a distinct advantage in identifying the source of particulate problems inside a structure.

A major problem confronting the diagnosis of indoor air quality problems and particulate measurement is the constant change common in the indoor environment. The individual constituents of the indoor aerosol vary continuously due to many reasons such as; changes in the climate or weather, proximity to major outdoor pollution sources or human activity inside the building. Hence, the government mandated fine particulate level of 2.5 microns may not be sufficient or the right way to separate particles based on size in every case. Depending on the conditions mentioned earlier, it might make sense to look for particles over 10 microns only during tree pollen season. Or in other cases it is necessary to look for particles between 1 and 10 microns such as mold, mildew and chemical weapon spores. Regardless of the reason, the ability to change the particle sizing criteria based on various initiating events is a substantial refinement in particulate detection systems and is a major improvement over existing art.

Light scattering photometers, usually calibrated against a known standard of particulate such as Arizona road dust, provide an estimation of total suspended particulate matter in the air. These instruments are sensitive to particle sizes (diameter) from 0.1 micrometer to around 10 micrometers. The major advantage of these instruments is their relative low cost, ease of use, and portability. The major disadvantage of these instruments is their inability to separate particles based on size.

Laser particle counters are similar to photometers, however they normally come equipped with particle sizing or other physical means to remove or screen out particles of a certain size. Particle sizing or selection of the "cut point" is done manually to the instrument prior to putting the instrument in use. There is no method for dynamically changing the size selection. These instruments are also easily overwhelmed with high particulate levels typical in second hand tobacco smoke.

Dynamic particle sizers are also available. These instruments use more complex methods than light scattering to determine the composition and size of aerosols. While able to output the quantity of particles in specific size brackets, the major limitations of these instruments are their inability to handle large quantities of particles commonly found in indoor environments, the need to manually adjust the specific cut point of the particle sizer, and the need to recalibrate the instrument in a laboratory environment before it can return to service in the field.

TERMINOLOGY

Throughout the remaining specification, including the claims, usage of the term "particulate" or "particle" refers to a general class of airborne particles capable of scattering light that are suspended in the air. The term "PM" is an abbreviation for particulate matter. The term "air quality monitoring appliance" refers to an appliance whose primary purpose is to use a plurality of sensor to measure various aspects of the quality of air presented.

SUMMARY OF THE INVENTION

The invention is targeted at improving the effectiveness of sizing airborne particulates by utilizing novel improvements in key measurement functions.

Towards this objective, embodiments of the invention provide for:

a. A plurality of indoor air quality monitoring appliances installed in a fixed or temporary fashion inside a structure such as a home or building, where, one or more of these monitoring appliances has a particulate measuring subsystem that is capable of identifying different ranges of particulate sizes by comparing particle size estimation data to a plurality of particle size reference values.

b. Most, preferably, each appliance has an ability to control the sensors in the appliance and communicating with the particulate subsystem. In one embodiment, this control is exercised via a microcontroller.

c. Most, preferably, each appliance has the ability to vary the number and/or value of the particle size reference values. In one embodiment, this is an array of voltage levels use to identify particle size based on comparison to reference values.

d. Most, preferably, each appliance has the communications capability to communicate with a controlling process. In one embodiment, this controlling process is a remotely located server. In another embodiment, the controlling process is integral to the appliance itself.

e. Most, preferably, each appliance, during the course of communication with said controlling process, can be supplied with new settings for the number and/or value of the particle size reference values.

f. One or more conditions may initiate change of said particle size reference values. In one embodiment, the detection of particles of a certain size range may cause the particle size reference values to be changed in order to further refine the measurements inside the initial size range.

BRIEF DESCRIPTION OF THE DRAWINGS

FIG. 5 illustrates a flowchart for changing particle size reference values, in accordance with one embodiment.

DETAILED DESCRIPTION OF THE PREFERRED EMBODIMENTS

Embodiments of a particle sizing data refinement system and its components are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

OVERVIEW

By re-thinking the design and programmability of the basic light scattering photometer, more information about particle size can be extracted from the light scattering signal by the use of a subsystem with multiple, programmable, pulse height discriminators as described in contemporaneously filed patent application by Kleefstra entitled "Particle Sizing Method" application Ser. No. 10/678,319, which is hereby fully incorporated by reference. This combination of particle sizing with remote control of the number and/or thresholds of particle size reference values provides the potential for dramatic improvement over existing methods and apparatus.

Figure 1:
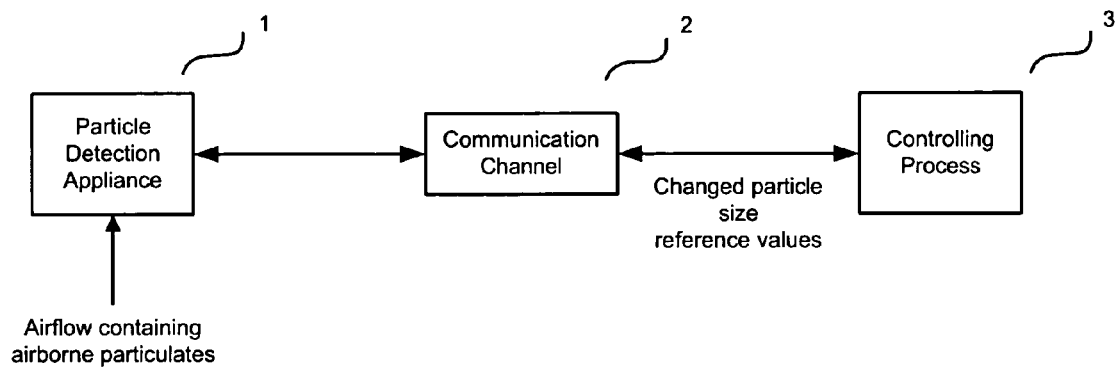
FIG. 1 illustrates a block diagram showing an overview of the invention, in accordance with one embodiment.

FIG. 1 shows the three components of a particle sizing data refining apparatus in accordance with one embodiment. A Particle Sizing Appliance 1 samples the air and estimates particle counts within several channels. Particle size reference values are employed to define the channel boundaries. For example, sizing channels might be defined as 0–2.5 micron diameter, 2.5–b 5 micron diameter, and 5 micron and over diameter. The particle size reference values would be 0, 2.5 and 5.0 for three channels. A controlling process 3 has the ability to communicate via communication channel 2 with the particle sizing appliance. The controlling process 3 can change the reference values to cause the particle sizing appliance to obtain particle count based on different channels. For example, changed reference values of 2.5, 3.0 and 3.5 may be communicated to the particle sizing appliance 1. Once this occurs, the appliance will use channels of 2.5–3.0 micro diameter, 3.0–3.5 micron diameter, and 3.5 micro and greater diameter. Using this technique the controlling process 3 is able to affect the particle size range and sensitivity reported by the particle sizing appliance 1. In various embodiments, the controlling process 3 comprises a remote server, a computer, and/or a hand held device. In other embodiments, the controlling process 3 may be practiced with other computing devices.

In various embodiments, the controlling process 3 may change the particle sizing reference values based on other data, including one or more of indoor air quality data, outdoor air quality data, temperature, humidity, carbon monoxide, carbon dioxide, radon, other gasses and compounds, organic and inorganic compounds.

In various embodiments, the communication channel 2 may be a selected one of Internet, Ethernet, wireless, 802.11, power-line, RF, direct wiring or printed circuit board traces.

Figure 2:
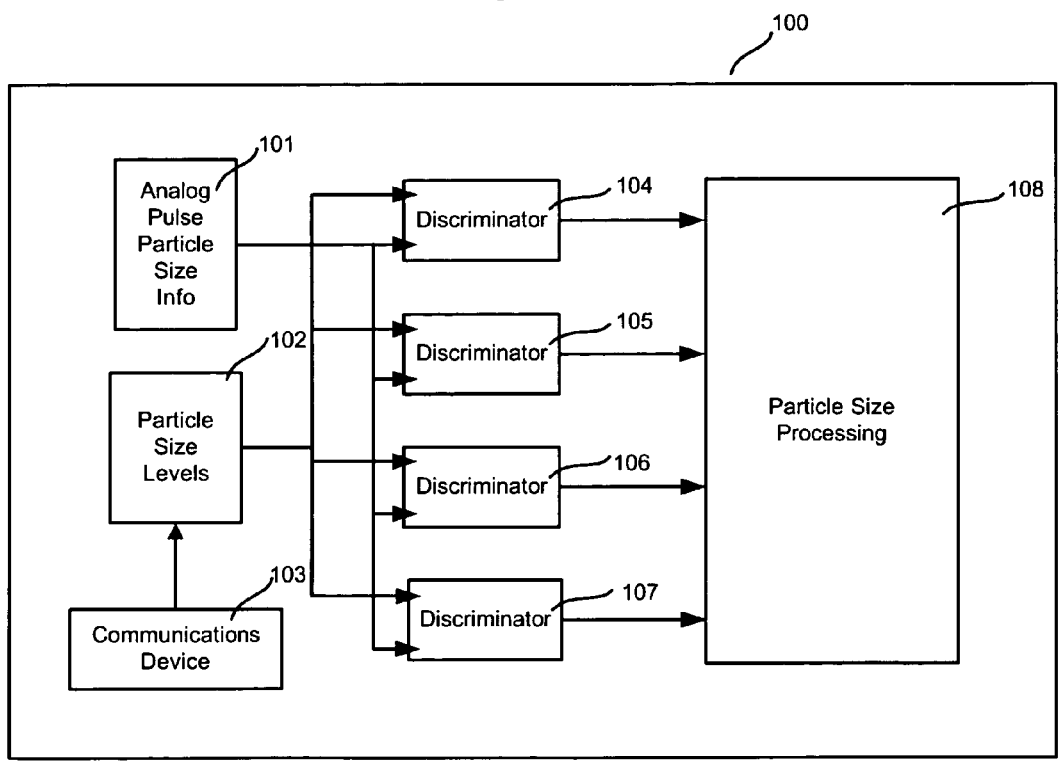
FIG. 2 illustrates a particle sizing apparatus capable of comparing particle size data against a plurality of particle size reference values, in accordance with one embodiment.

FIG. 2 provides additional detail of an embodiment of a particle size detection appliance 100. As described in the earlier identified contemporaneously filed co-pending application, analog pulse particle sizing information 101 can be obtained from a nephelometer. Analog pulse particle sizing information 101 is essentially an analog pulse where the pulse height is proportional to the particle size. When this pulse is connected to a device that provides an output when an input is over a given voltage or trigger level such as voltage discriminators 104, 105, 106 and 107 then over time, these discriminators provide digital pulses that represent particles that produced pulses that exceeded said discriminator levels. These levels can be programmed with a particle size level device 102 and can be controlled remotely via communications device 103.

Figure 3:
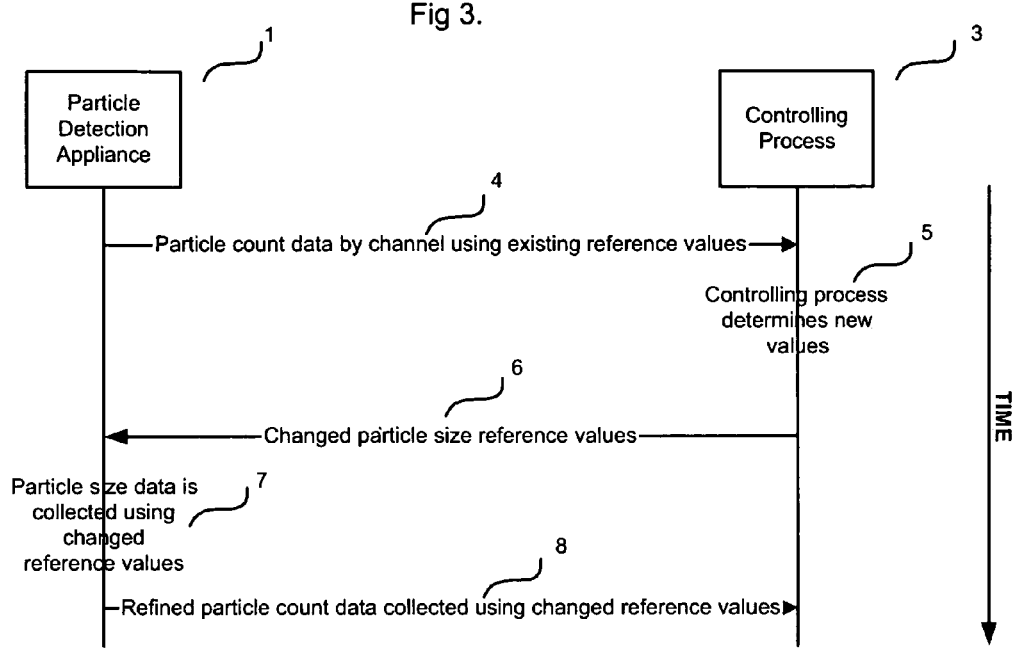
FIG. 3 illustrates the flow of a communication session between an apparatus and a controlling process, in accordance with one embodiment.

FIG. 3 describes a logical communication session between the particle sizing appliance 1 and the controlling process 3, in accordance with one embodiment. The communication channel is not represented but is assumed to exist. The figure shows messages 4, 6, 8 and events 5, 7. The communication proceeds as follows: The controlling process 3 receives the current particle count data by channel from the particle sizing appliance 1 via a message 4. The controlling process 3 then uses a software or firmware algorithm to determine new particle sizing reference values (shows as event 5). The controlling process 3 communicates the change reference values to the appliance via message 6. Using the changed reference values, the particle sizing appliance 1 re-samples the air to determine refined particle sizing data based on the changed reference values (shown as event 7). Finally, the particle sizing appliance 1 communicates the refined sizing data to the controlling process 3 via a final message 8. Changing the reference values 5, communicating the values 6, and re-sampling the air 7, represent the essential aspects of this invention. Messages 4 & 8 are specific to this embodiment.

Figure 4:
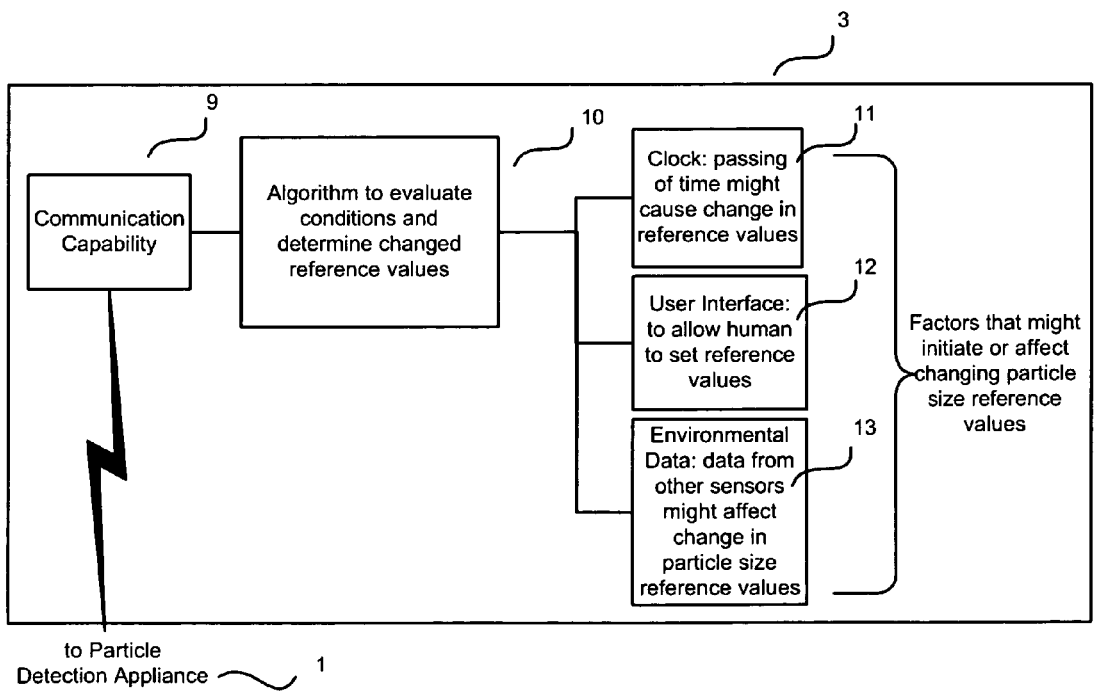
FIG. 4 illustrates the logical components of a controlling process, in accordance with one embodiment.

FIG. 4 provides additional details of one embodiment of the controlling process 3. First, the controlling process 3 is equipped to communicate to the particle sizing appliance 1 via a communication channel such as a modem or direct connection 9. The major component of the controlling process 3 is the algorithm 10 to determine new values for the particle size reference values. The algorithm may utilize a plurality of sources 1, 11, 12, 13 to initiate and affect the calculation of new reference values. First, the particle sizing appliance 1 itself may send data used by algorithm when the algorithm determines new reference values. The passing of time as determined by a clock or time tracking device 11 may be accessed by the algorithm 10 to determine if the reference values should be changed. Additionally and optionally, a User interface 12 may be accessed to obtain information from a human user. The algorithm 10 may use this information to determine new reference values. Another option provides for the algorithm 10 to access data from additional sensors 13 (such as temperature humidity sensors) to be analyzed when determining new reference values.

FIG. 5 is a flowchart of the behavior of the invention in one particular embodiment. The scenario described is by the flowchart is as follows: The invention is normally scanning for general particulate readings 14. When the controlling process detects a high count of particle in the "pollen" size range 15, it changes the reference values used by the particle sizing appliance 16 & 17, in order to measure the particles in a reduced size range with more sensitivity, and to attempt to detect "ragweed pollen" size materials more specifically 18. If sufficient particles in the "ragweed pollen" size are detected, an alert is issued 19. Finally, the controlling process set the particle size reference values back to the normal configuration 20 and returns to normal scanning.

As can be seen from the above description, a novel system for refinement of particle sizing data is disclosed. The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above description.

What is claimed is:

1. A method comprising,
   specifying a first plurality of particle size reference values indicating at least one range of particle sizes;
   obtaining first particle size data of particles within the at least one range of particle sizes based at least in part on said specified first plurality of particle size reference values;
   receiving the first particle size data;
   changing said first reference values to second reference values in view of other environmental data including one or more of indoor air quality data, outdoor air quality data, temperature, humidity, carbon monoxide, carbon dioxide, radon, other gases and compounds, organic, and inorganic compounds; and
   obtaining second particle size data based at least in part on said second reference values.

2. The method of claim 1, wherein said changing of said first reference values to said second reference values is performed after passage of a time period.

3. The method of claim 1, wherein said changing of said first reference values to said second reference values is performed in view of said first particle size data obtained.

4. The method of claim 1, wherein said changing of said first reference values to said second reference values is performed in response to a human initiated event.

5. The method of claim 1, wherein said changing of said first reference values to said second reference values is initiated by programmatic means.

6. The method of claim 1, wherein said changing of said first reference values to said second reference values is performed periodically.

7. The method of claim 1, wherein said second reference values specify sub-ranges of one of said first reference values.

* * * * *